O. DALFOND.
COMPOUND LEVER.
APPLICATION FILED JAN. 9, 1911.

1,035,324.

Patented Aug. 13, 1912.

WITNESSES:
Frederick R. Johnston
Ahin G. Weeks
Cas. Scott
W. W. Edelin

Octavien Dalfond INVENTOR

W. H. Babcock & Son
ATTORNEYS

UNITED STATES PATENT OFFICE.

OCTAVIEN DALFOND, OF FALL RIVER, MASSACHUSETTS, ASSIGNOR TO THE STANDARD EQUIPMENT COMPANY, A CORPORATION OF MASSACHUSETTS.

COMPOUND LEVER.

1,035,324. Specification of Letters Patent. Patented Aug. 13, 1912.

Application filed January 9, 1911. Serial No. 601,761.

*To all whom it may concern:*

Be it known that I, OCTAVIEN DALFOND, a citizen of the United States, residing at Fall River, in the county of Bristol and State of Massachusetts, have invented certain new and useful Improvements in Compound Levers, of which the following is a specification.

This invention relates to an improvement in friction let off particularly applicable to looms for weaving cotton, woolen and other fabrics. Its object is to increase the steadiness of action of the machine.

A further object is to provide compactness, simplicity and a wide and delicate adjustability of the tension, all of which objects, among others, are accomplished by the construction and combination of parts hereinafter more particularly set forth and claimed.

Figure 1:
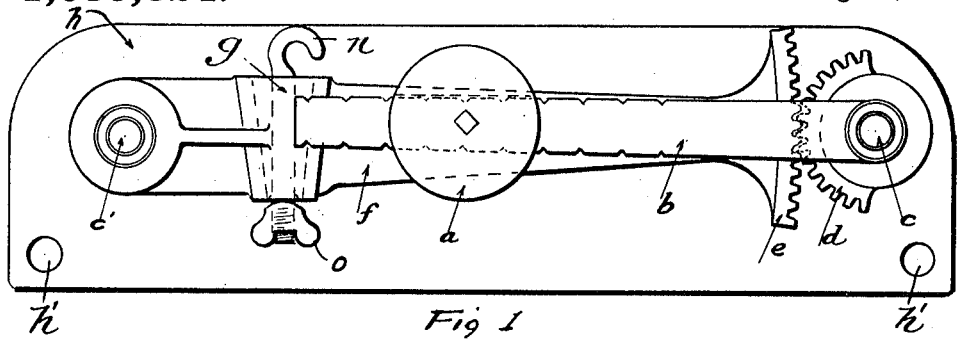
Figure 2:
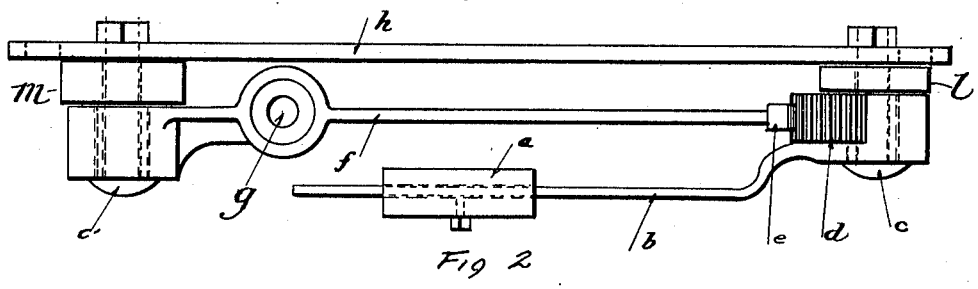

In the drawings: Figure 1 represents a view in side elevation of a device embodying my invention; Fig. 2, a top plan view of the same; and Figs. 3 and 4, detail plan views of a slight modification thereof.

Referring now to the drawings in detail, $h$ designates a support or bracket of plate metal or other suitable material mounted on the frame of a loom or other machine to which it is applicable by means of fastening devices passing through the holes $h'$ near its two lower corners respectively, or other suitable means of securing the same in place, and provided with two bolts about midway the width of said plate and in the same horizontal plane one near each end respectively. Two levers $b$ and $f$ are mounted on said bracket by means of bolts $c$ and $c'$ respectively passing through said bolt holes. These two levers are separated from the plate by means of washers $l$ and $m$ mounted on bolts $c$ and $c'$ respectively between the hubs of said levers and the bracket $h$, the washer $m$ being slightly thicker than the washer $l$ in order to hold the hub of lever $f$ at a greater distance from the bracket than the hub of lever $b$. These levers are arranged normally in the same horizontal plane, parallel to each other and with their arms extending in opposite directions toward the hubs of each other respectively, this arrangement being found to give the desired compactness.

The lever $f$ is straight and extends toward the right. It is provided near its hub with an enlargement having an upwardly flaring hole $g$ therethrough. The stem of a hook $n$, which engages the rope or chain (not shown) that passes over and around the friction pulley as usual, passes through this flaring hole $g$. The bottom of this hole is slighty countersunk on a taper and flares downward, see Figs. 1 and 3. A wing-nut $o$ having a convex upper face is turned on the lower end of the stem of hook $n$, the upward flaring of said hole $g$, the countersinking of its lower end and the convexity of the face of nut $o$ which engages the lower part of the lever $f$ on the countersunk of said hole $g$ providing for the automatic adjustment of the inclination and direction thereof of the hook $n$ with relation to the position of lever $f$. Said lever $f$ is further provided on its right hand end with a quadrant or set of gear teeth $e$. The lever $b$ is bent on a sharp curve at its hub outward away from the bracket $h$ and lever $f$ and then runs from said curved part, which forms a rounded shoulder, straight outside of, and parallel with, said lever $f$ toward the hub of the latter. An adjustable weight $a$ is slidably mounted on said lever $b$ and provided with a friction screw or bolt $a'$ for locking the weight $a$ in any desired position of adjustment. Slight nicks or marks may be made in lever $b$, see Fig. 1, to aid in adjusting said weight. The hub of lever $b$ is provided on its face toward the lever $f$ with a quadrant or series of gear teeth $d$ meshing with the gear teeth $e$ of lever $b$. It will be noted that the washer $m$, above mentioned, being thicker than washer $l$, holds the lever $f$ well out, thus keeping the teeth $e$ of the latter well over from the inner edge of the teeth $d$, thus providing a safeguard against any side-slipping of the former toward the bracket $h$.

The operation is very simple and obvious from the drawings and the above. To increase the tension the weight $a$ is slid along the lever $b$ away from its hub to the point desired and locked by the friction screw $a'$. Of course the farther away from the hub this weight is moved the greater will be the leverage exerted by it. Thus the hub will gradually be turned on the bolt $c$, which acts as the fulcrum for said lever $b$, as the weight is moved away from it. The teeth $d$ thereof meshing with the teeth $e$ of lever $f$ will gradually therefore turn to the left and force the lever $f$ to swing downward on its bolt $c'$, which acts as a fulcrum for the same, thus lowering the hook $n$, which pulls on the rope or chain before mentioned but not shown. To decrease the tension the weight $a$ is adjusted toward the hub of lever $b$ and the reverse action from that above described takes place.

Figure 3:
Figure 4:
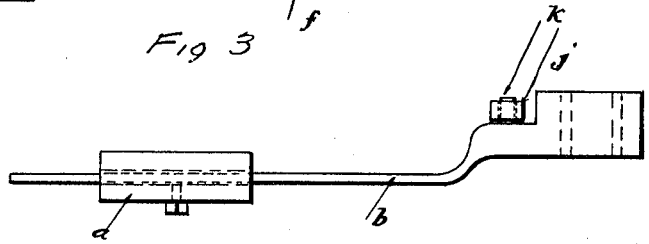

In the modification illustrated in Figs. 3 and 4 the lever $f$ is provided on its right end with an integral fork $i$ which receives a roller $j$ mounted to rotate on a lug $k$ integral with lever $b$. This construction takes the place of the gear teeth $d$ and $e$ above described. Otherwise the construction and operation is the same as in the preferred form.

It will be understood that while in the drawing and the above description the levers, their hubs and gear teeth, or in the modification the fork and lug are made integral this feature is not necessary and also that other modifications may be made in the construction and arrangement of the several parts without departing from this invention.

Having thus described my invention, what I claim as new and desire to secure by Letters Patent is:

1. A pair of straight arms normally in the same horizontal plane, one outside of the other, pivoted at their opposite ends and provided at their proximate ends with a pair of meshing cog gear segments, in combination with a weight adjustable on one of said arms and a hook attached to the other arm.

2. A bracket and a pair of levers pivotally mounted thereon one outside of the other and provided with intermeshing gear teeth on their proximate ends, in combination with a weight slidably adjustably mounted on one of said levers and a hook mounted in the other lever.

3. A bracket and a pair of levers pivotally mounted thereon and running in opposite directions toward the hubs of each other and provided with intermeshing gear teeth, in combination with an adjustable hook mounted in one of said levers and an adjustable weight slidably mounted on the other lever.

In testimony whereof, I affix my signature in the presence of two witnesses.

OCTAVIEN DALFOND.

Witnesses:
FREDERICK R. JOHNSTON,
ALVIN G. WEEKS.

---

Copies of this patent may be obtained for five cents each, by addressing the "Commissioner of Patents, Washington, D. C."